(12) United States Patent
Tsubota et al.

(10) Patent No.: US 7,802,771 B2
(45) Date of Patent: Sep. 28, 2010

(54) FLUID CONTROL DEVICE

(75) Inventors: Kenji Tsubota, Osaka (JP); Michio Yamaji, Osaka (JP); Shigeru Itoi, Osaka (JP); Tsutomu Shinohara, Osaka (JP); Ichiro Tokuda, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 662 days.

(21) Appl. No.: 10/548,084

(22) PCT Filed: Nov. 30, 2004

(86) PCT No.: PCT/JP2004/018106

§ 371 (c)(1),
(2), (4) Date: Sep. 6, 2005

(87) PCT Pub. No.: WO2005/075866

PCT Pub. Date: Aug. 18, 2005

(65) Prior Publication Data

US 2006/0175563 A1    Aug. 10, 2006

(30) Foreign Application Priority Data

Feb. 10, 2004  (JP) .............................. 2004-032951

(51) Int. Cl.
*F16K 31/00* (2006.01)
(52) U.S. Cl. .......................... 251/63.5; 251/96; 251/331
(58) Field of Classification Search .................. 251/25, 251/63.5, 100, 95, 96, 14, 331
See application file for complete search history.

(56) References Cited

U.S. PATENT DOCUMENTS 3,175,473 A * 3/1965 Boteler et al. ................ 251/331
2003/0201015 A1 * 10/2003 Fukano ........................ 137/556

FOREIGN PATENT DOCUMENTS

| JP | 1986-67482 | 5/1986 |
| JP | 9-203478 | 8/1997 |
| JP | 2000-283328 | 10/2000 |
| JP | 3075790 | 12/2000 |
| JP | 2001-289336 | 10/2001 |
| JP | 2003-294165 | 10/2003 |
| JP | 2003-343753 | 12/2003 |

* cited by examiner

*Primary Examiner*—John K Fristoe, Jr.
*Assistant Examiner*—Andrew J Rost
(74) *Attorney, Agent, or Firm*—Kratz, Quintos & Hanson, LLP

(57) ABSTRACT

A fluid control device 71 includes a working member 75 in automatic opening and closing, which is moved vertically by introduction or discharge of compressed fluid to or from a compressed fluid inlet chamber 90 formed in a casing 73 to move a valve element holder 5 to an opening position against bias force of a compression coil spring 77, and an working member 74 in manual opening and closing, which is moved vertically by a manual operation and directly presses the valve element holder 5 downward when it is moved downward.

7 Claims, 10 Drawing Sheets

FLUID CONTROL DEVICE

TECHNICAL FIELD

The present invention relates to a fluid control device, in particular, a fluid control device with an improved automatic valve which automatically shuts off or opens a fluid channel using a fluid pressure.

BACKGROUND ART

There has been well known a fluid control device comprising a valve case having a fluid channel, a casing provided above the valve case, a valve element opening and closing the fluid channel, a valve element holder moved between a closing position at which it is moved downward to set the valve element in a closed state and an opening position at which it is moved upward to set the valve element in an open state, an elastic member biasing the valve element to the closing position or the opening position, and a working member in automatic opening and closing which is vertically moved by automatically opening and closing means to move the valve element holder to the opening position or the closing position against force of the elastic member (Patent Document 1: the publication of JP-A No. 2000-283328). The fluid control device disclosed in Patent Document 1 is of an automatic type (automatic valve) which automatically moves a valve stem serving as an working member in automatic opening and closing using compressed air. However, there has also been well known a manual fluid control device (manual valve) which manually moves a valve stem serving as a working member in manual opening and closing by turning an operation handle.

The above conventional automatic valve and manual valve are generally combined to constitute an opening and closing mechanism. In its normal use state, a fluid channel is controlled by closing and opening operation of the automatic valve while the manual valve is in an open state and when it becomes necessary to shut off the fluid channel in the event of an emergency, an operator operates the manual valve. Thus, to use both automatic valve and manual valve wastes cost and space.

It is an object of the present invention to provide a fluid control device having both functions as a manual valve and an automatic valve in which a conventional opening and closing mechanism comprising the automatic valve and the manual valve can be replaced with one control device.

DISCLOSURE OF THE INVENTION

A fluid control device according to the present invention comprises a valve case having a fluid channel, a casing provided above the valve case, a valve element opening and closing the fluid channel, a valve element holder moved between a closing position at which it is moved downward to set the valve element in a closed state and an opening position at which it is moved upward to set the valve element in an open state, an elastic member biasing the valve element to the closing position or the opening position, and a working member in automatic opening and closing, which is vertically moved by automatically opening and closing means to move the valve element holder to the opening position or the closing position against bias force of the elastic member. The fluid control device further comprises a working member in manual opening and closing, which is vertically moved by a manual operation to press the valve element holder downward when it is moved downward.

The fluid control device may be a normally open type in which the fluid channel is opened when the automatically opening and closing means is OFF or may be a normally closed type in which the fluid channel is closed when the automatically opening and closing means is OFF.

The automatically opening and closing means may be performed by introduction or discharge of the compressed fluid to the compressed fluid inlet chamber formed in the casing or by electromagnetic force.

The working member in manual opening and closing may press the valve element holder downward through the working member in automatic opening and closing, or the working member in manual opening and closing may (directly) press the valve element holder without using the working member in automatic opening and closing. A first embodiment belongs to the former, and a second embodiment belongs to the latter. According to the first embodiment, the valve stem (stem-shaped body) serving as the working member in automatic opening and closing in the automatic valve is applied to the working member in automatic opening and closing of the present invention, the working member in manual opening and closing which was moved downward by the manual operation moves the working member in automatic opening and closing downward and, accordingly, the working member in automatic opening and closing presses the valve element holder downward. According to the second embodiment, the valve stem (stem-shaped body) serving as the working member in manual opening and closing in the manual valve is applied to the working member in manual opening and closing of the present invention, the working member in manual opening and closing which was moved downward by the manual operation directly presses the valve element holder downward, and the working member in automatic opening and closing is vertically moved by the automatically opening and closing means regardless of the vertical movement of the working member in manual opening and closing.

As a more concrete constitution of the fluid control device, a movable channel member movably fitted in a tube-shaped body serving as the working member in manual opening and closing is further provided. Herein, the working member in manual opening and closing is arranged in a fluid-tight casing and moved to an automatic opening and closing enabled position at which there is a predetermined gap between the working member in automatic opening and closing and an upper surface of a part moving integrally therewith, to an automatic opening and closing disabled position at which it abuts on the upper surface of the part moving integrally with the working member in automatic opening and closing, and to a working position at which it is further moved downward to lower the working member in automatic opening and closing by manually operating an operation handle, the movable channel member is stopped at a position where its travel distance is smaller than a travel distance when the working member in manual opening and closing is moved from the automatic opening and closing enabled position to the automatic opening and closing disabled position, a compressed fluid channel is formed in the working member in automatic opening and closing, which has an upper end provided in a lower part of the working member in manual opening and closing and extends downward from the upper end to be continued to a compressed fluid inlet chamber, a compressed fluid channel positioned near a lower end of the movable channel member and a fluid outlet channel positioned near an upper end of the movable channel member are formed in the casing, a compressed fluid channel continued to the compressed fluid channel of the casing when the working member in manual opening and closing is in the automatic opening and closing enabled position, and a fluid outlet channel continued to the fluid outlet channel of the casing when the working member in manual opening and closing is lowered to the automatic opening and closing disabled position are formed in the working member in manual opening and closing, and a compressed fluid channel which connects to the compressed fluid channel in the working member in manual opening and closing, to the compressed fluid channel in the working member in automatic opening and closing when the working member in manual opening and closing is in the automatic opening and closing enabled position, and a fluid outlet channel which connects the fluid outlet channel in the working member in manual opening and closing to the compressed fluid channel in the working member in automatic opening and closing when the working member in manual opening and closing is lowered to the automatic opening and closing disabled position and the movable channel member is relatively moved upward with respect to the working member in manual opening and closing, and shuts off the connection when the working member in manual opening and closing is in the automatic opening and closing enabled position are formed in the movable channel member (first embodiment).

According to the first embodiment, the part moving integrally with the stem-shaped body is a piston forming the upper surface of the compressed fluid inlet chamber normally. The working member in manual opening and closing is integrated with the operation handle through an operation axis, and a male thread screwed in a female thread provided in the casing is formed in the working member in manual opening and closing. Thus, when the operation handle is turned, the working member in manual opening and closing in the automatic opening and closing enabled position is lowered while being rotated. Although an operation angle of the handle is not particularly limited, when this angle is set at 90°, operability is preferable. The compressed fluid channel and fluid outlet channel formed in the casing, the stem-shaped body, the working member in manual opening and closing and the movable channel member are not particularly limited, and various kinds of constitutions can be employed so that they can connect the compressed fluid inlet chamber to the outside of the casing and shut off the compressed fluid inlet chamber in accordance with the movement of the working member in manual opening and closing and the movable channel member.

According to the fluid control device of the first embodiment, the working member in manual opening and closing is normally retained in the automatic opening and closing enabled position, and in this state, the compressed fluid can be introduced from the outside to the compressed fluid inlet chamber or can be discharged from the compressed fluid inlet chamber to the outside through the compressed fluid channel formed in the fluid control device. In short, the fluid control device functions as the normal automatic valve. When the working member in manual opening and closing is moved to the automatic opening and closing disabled position by operating the operation handle, the lower surface of the working member in manual opening and closing abuts on the upper surface of the part which is moved integrally with the stem-shaped body and at the same time, the compressed fluid is discharged from the compressed fluid inlet chamber to the outside through the fluid outlet channel formed in the fluid control device. Thus, the pressure in the compressed fluid inlet chamber working on the stem-shaped body is removed. When the operation handle is further moved from this state, the working member in manual opening and closing is further moved downward and, accordingly, the stem-shaped body is moved downward. Thus, the movement of the stem-shaped body, that is, the channel opening and closing operation can be easily performed by the manual operation in the event of an emergency.

The means for stopping the movable channel member at a position in which a travel distance of the movable channel member is smaller than that of the working member in manual opening and closing includes, for example, an elastic member (compression coil spring, disc spring or the like) which biases the movable channel member downward, and a stem-shaped stopper which prevents the movable channel member from being further lowered. The stopper is implemented by an annular sealing member (O-ring or the like) received by an annular groove or an annular stepped portion formed at the upper end of the stem-shaped body, and the lower end of the movable channel member abuts on the annular sealing member.

Thus, when the working member in manual opening and closing is lowered, the movable channel member is lowered together with the working member in manual opening and closing by downward biasing of the elastic member, and then stopped by the stopper. When the working member in manual opening and closing is further lowered, the movable channel member is relatively moved upward with respect to the working member in manual opening and closing. When the stopper is the annular sealing member, the compressed fluid channel formed between the upper end of the stem-shaped body and the movable channel member can be surely shut off even when the fluid is at high pressure.

It is preferable that the movable channel member is in the shape of almost a circular column having a flange near its upper end, an annular groove in which the flange of the movable channel member is fitted so as to be vertically movable, and a fluid outlet channel connecting the annular groove and the fluid outlet channel in the casing wall are formed in the working member in manual opening and closing, and an annular sealing member which is pressed downward by the flange of the movable channel member biased by the elastic member in the automatic opening and closing enabled position is provided in the annular groove of the working member in manual opening and closing.

Thus, the shutoff and connection of the fluid outlet channel can be surely and easily implemented with a simple constitution.

It is preferable that a projected portion is formed at an upper end of the working member in manual opening and closing, a recessed portion is formed at a lower end of an operation axis fixed to the operation handle, a plurality of protrusions are formed at equal intervals in a peripheral direction on one of the outer periphery of the projected portion of the working member in manual opening and closing and the inner periphery of the recessed portion of the operation axis, and grooves which are integral multiple of the number of the protrusions in number are formed at equal intervals on the other. In this case, it is more preferable that a large number of bumps (about 20 to 40) such as serration are formed on the one of them so that adjustment of 9 to 18° can be performed by shifting the serration one by one.

Thus, the operation handle and the working member in manual opening and closing can be easily integrated and the operation axis can be fitted in the working member in manual opening and closing so that the handle can be turned in a predetermined direction.

As another more concrete constitution of the fluid control device for example, for example, the working member in manual opening and closing serves as a stem-shaped body which is moved by a manual operation to an automatic opening and closing disabled position at which a lower end presses a top surface center of the valve element downward and to an automatic opening and closing enabled position at which the lower end is separated from the top surface center of the valve element holder, and the working member in automatic opening and closing serves as a tube-shaped body which is fitted in the stem-shaped working member in manual opening and closing so as to be relatively and vertically movable and moved to a closing position at which a lower end is biased by the elastic member to press a top surface periphery of the valve element holder downward and to an opening position at which the lower end is separated from the top surface center of the valve element holder by automatically opening and closing means (second embodiment).

According to the second embodiment, the concrete constitution of the automatically opening and closing means (compressed air, electromagnetic force or the like) can be optional, and the operation of the working member in manual opening and closing can be performed regardless of the force working from the automatically opening and closing means to the working member in automatic opening and closing.

In this case, an upper guide and a lower guide separated by a counter plate are formed in the casing, the working member in automatic opening and closing has an upper piston guided by the upper guide and a lower piston guided by the lower guide, a compressed air inlet chamber is formed between the counter plate and the upper piston of the working member in automatic opening and closing, the working member in manual opening and closing has an axis-direction channel, a lower end diameter-direction channel extending from the axis-direction channel in a diameter direction and continued to the compressed fluid inlet chamber through a diameter-direction through hole provided in the working member in automatic opening and closing, and a middle diameter-direction channel extending from a middle part of the axis-direction channel in the diameter direction and continued to the compressed fluid inlet portion provided at a peripheral wall of the casing body. For example, when the fluid control device serves as a diaphragm valve, although it is preferable that the automatically opening and closing means is implemented by the compressed air, when the channels such as the axis-direction channel and the diameter-direction channel are formed in the working member in manual opening and closing, there can be provided a diaphragm valve which is compact in constitution and operated by automatic and manual operations.

For example, the lower end diameter-direction channel of the working member in manual opening and closing and a space of a lower part of the lower piston of the working member in automatic opening and closing are continued by a gap on an inner periphery of the working member in automatic opening and closing, a second diameter-direction through hole formed in the working member in automatic opening and closing, and a gap on an outer periphery of the working member in automatic opening and closing. Thus, not only the compressed air inlet chamber formed between the counter plate and the upper piston of the working member in automatic opening and closing, but also the space at the lower part of the lower piston becomes the chamber of the compressed air. As a result, the working member in automatic opening and closing can be pressed upward by greater force without adding any component.

According to the fluid control device of the present invention, the working member in manual opening and closing is normally retained in the automatic opening and closing enabled position and, in this state, the fluid channel can be opened or closed by the automatically opening and closing means (for example, introduction of the compressed fluid from the outside to the compressed fluid inlet chamber and discharge of the compressed fluid from the compressed fluid inlet chamber to the outside through the compressed fluid channel formed in the fluid control device). That is, the fluid control device functions as the normal automatic valve. When the working member is moved to the automatic opening and closing disabled position by operating the operation handle, the working member in manual opening and closing presses the valve element holder downward through the working member in automatic opening and closing or directly. Thus, the fluid channel can be easily shut off by the manual operation in the event of the emergency.

BRIEF DESCRIPTION OF THE DRAWINGS

FIGS. 3(a) and 3(b) show a constitution of an operation axis of the fluid control device according to the present invention, in which FIG. 3(a) is a vertical sectional view and FIG. 3(b) is a sectional view taken along line B-B in FIG. 3(a).

FIGS. 4(a) and 4(b) show a constitution of a working member of the fluid control device according to the present invention, in which FIG. 4(a) is a vertical sectional view and FIG. 4(b) is a sectional view taken along line B-B in FIG. 4(a)

BEST MODE FOR CARRYING OUT THE INVENTION

Embodiments of the present invention will be described below with reference to the drawings hereinafter. In the following description, the terms "left" and "right" refer respectively to the left- and right-hand sides of the drawings.

Figure 1:
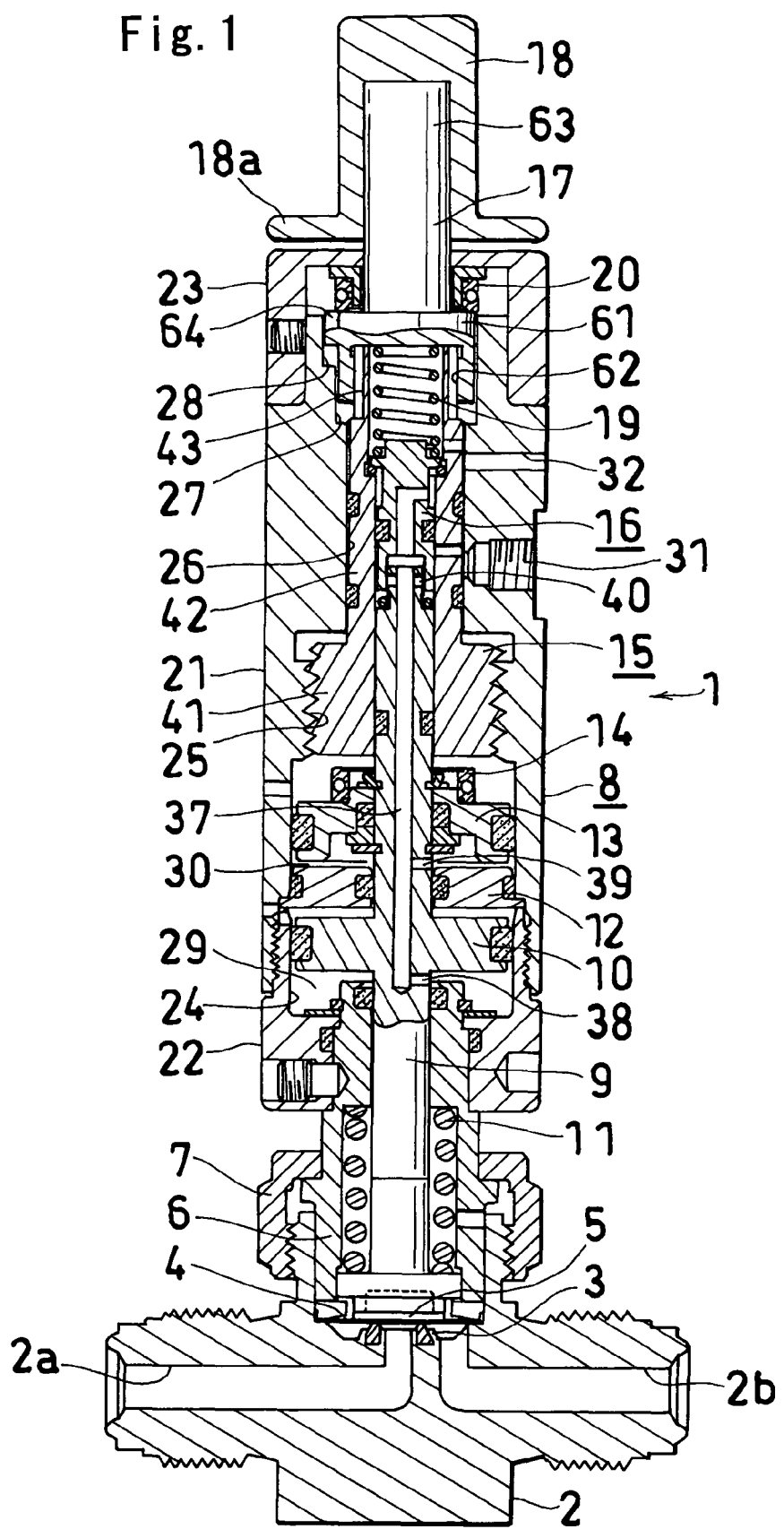
FIG. 1 is a vertical sectional view showing a first embodiment of a fluid control device according to the present invention in an automatic opening and closing enabled state.
Figure 2:
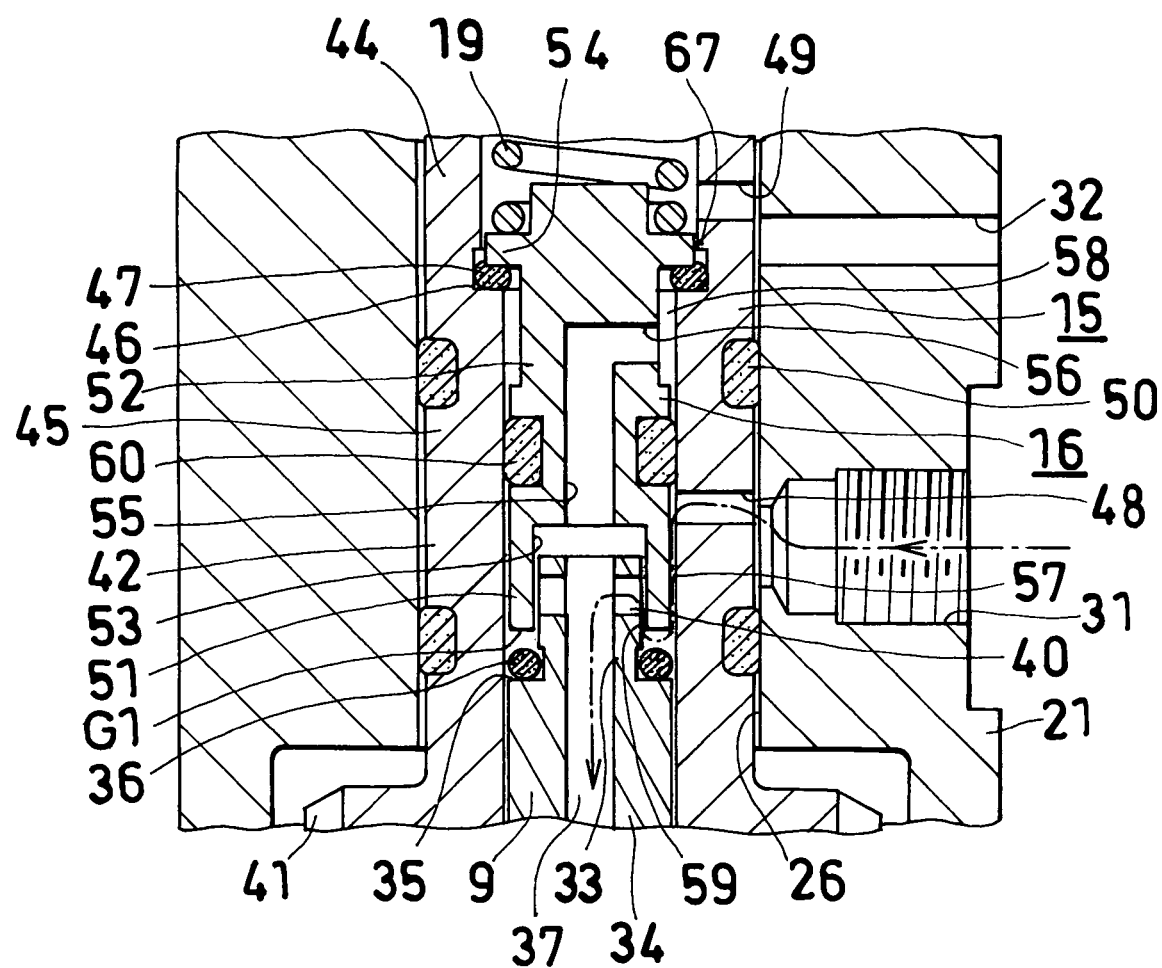
FIG. 2 is an enlarged vertical sectional view showing a main part of the same.
Figure 3:
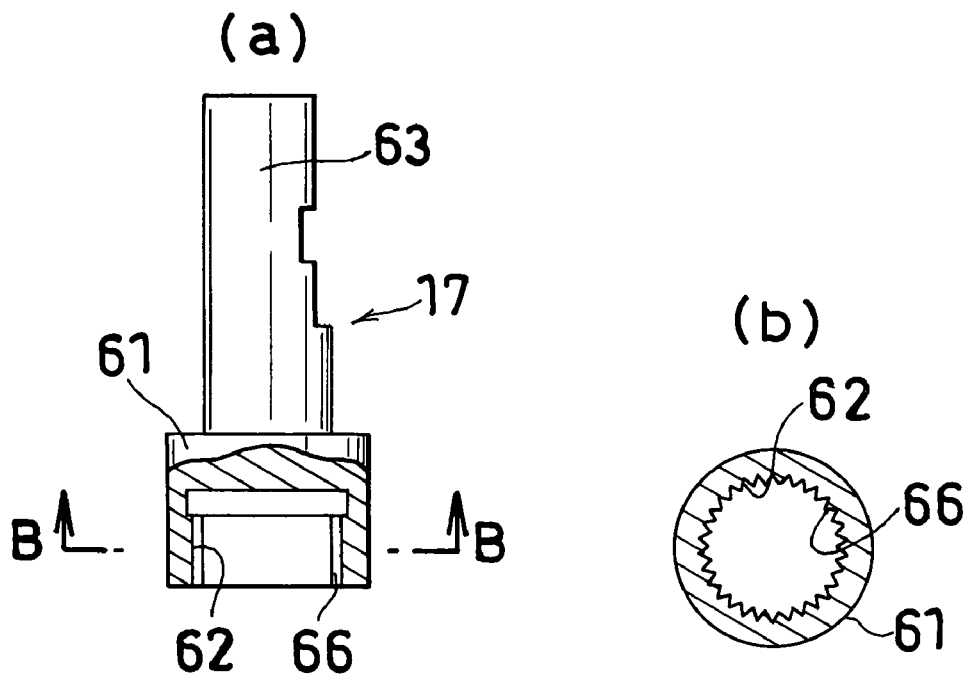
Figure 4:
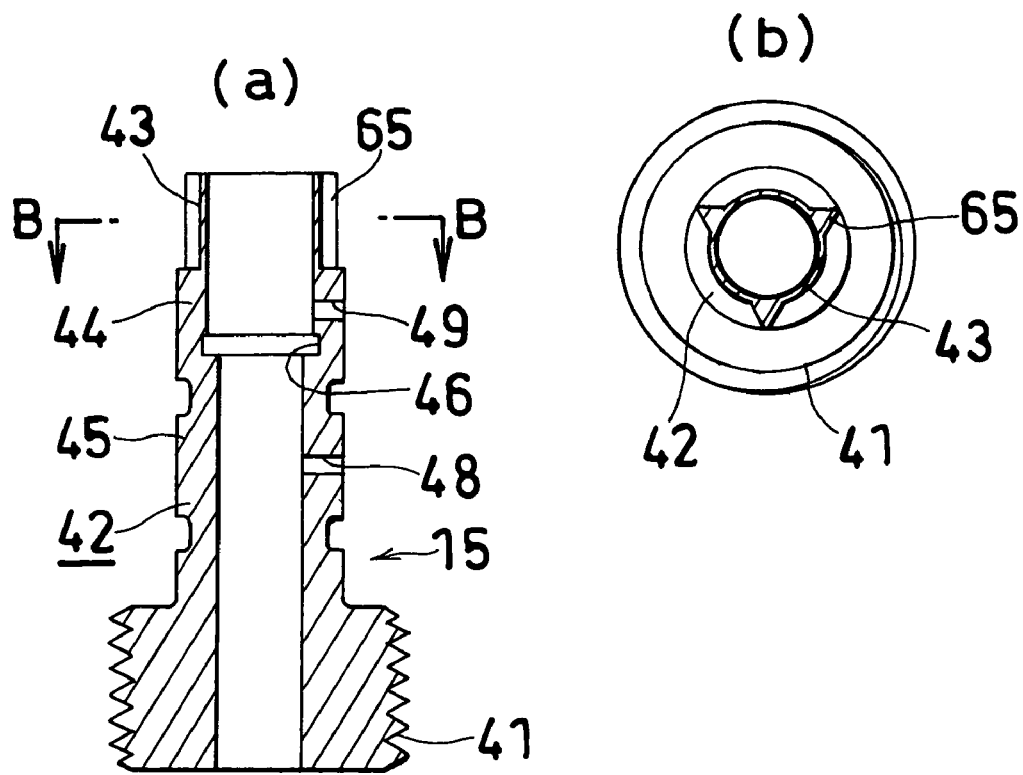
Figure 5:
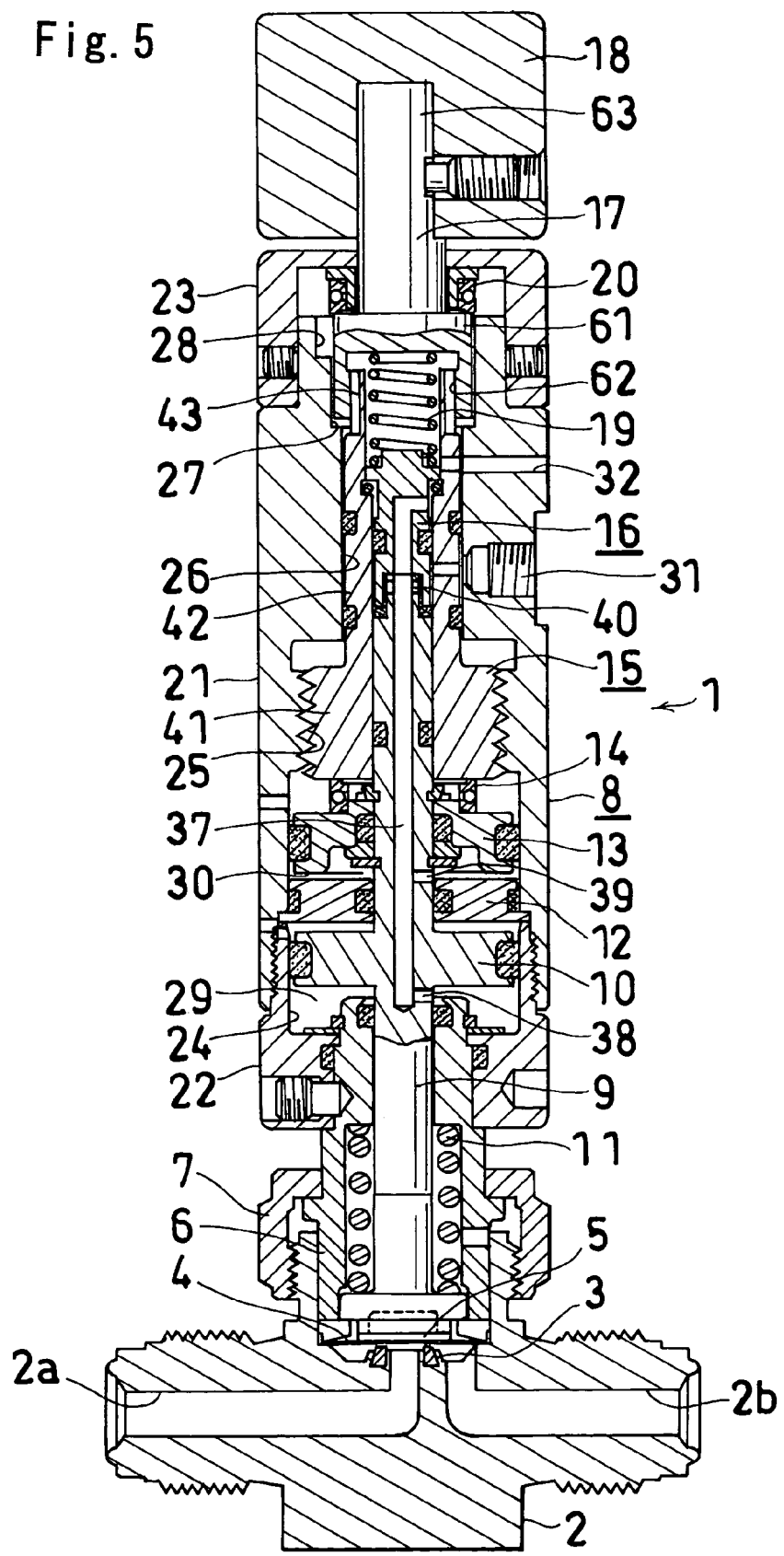
FIG. 5 is a vertical sectional view showing the first embodiment of the fluid control device according to the present invention in an automatic opening and closing disabled state.
Figure 6:
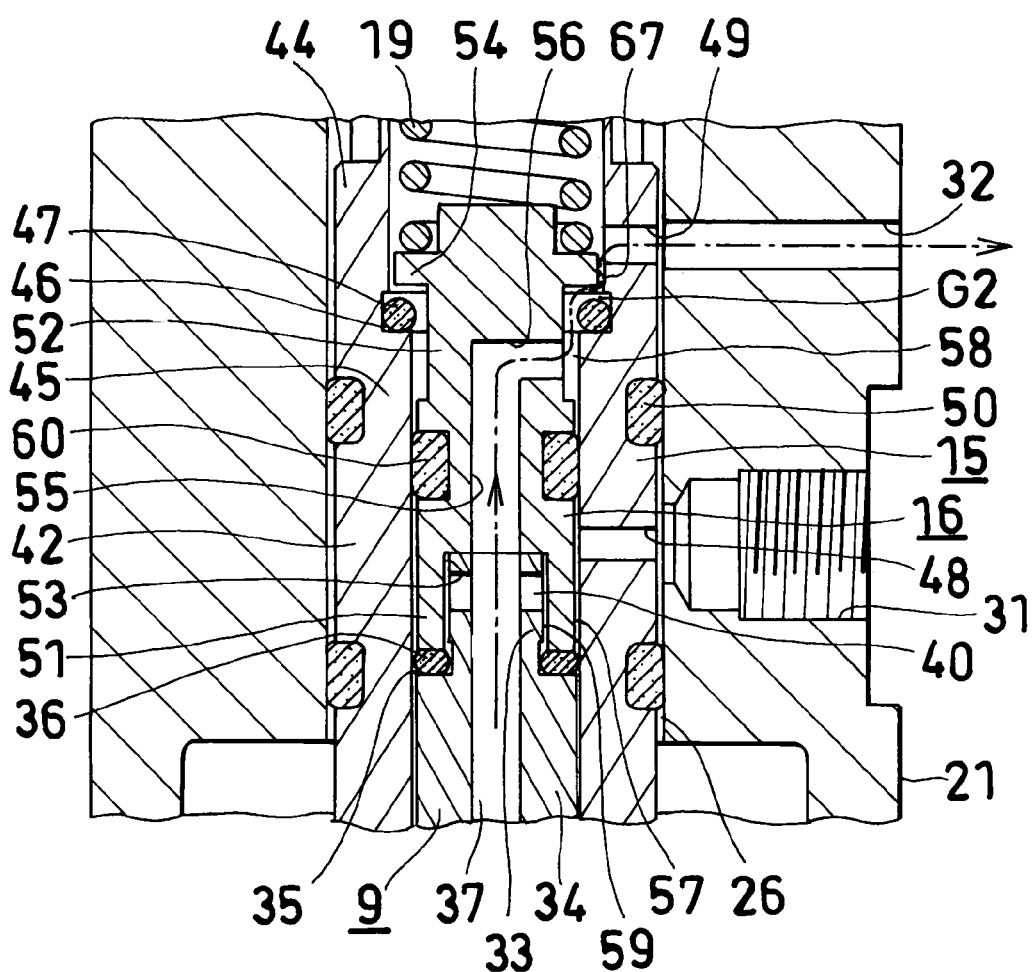
FIG. 6 is an enlarged vertical sectional view showing a main part of the same.

FIGS. 1 to 6 show a first embodiment of a fluid control device according to the present invention. FIGS. 1 and 2 show a closed state of an automatic opening and closing enabled state where a tube-shaped body (15) serving as a working member in manual opening and closing is in an automatic opening and closing enabled position and a stem-shaped body (9) serving as a working member in automatic opening and closing is in a closing position. FIGS. 5 and 6 show a state where the tube-shaped body (15) serving as the working member in manual opening and closing is in an automatic opening and closing disabled position, and a position of the stem-shaped body (9) serving as the working member in automatic opening and closing is restricted by the tube-shaped body (15).

A fluid control device (1) according to the first embodiment comprises a valve case (2) having a fluid inlet channel (2a) and a fluid outlet channel (2b), an annular valve seat (3) provided at a peripheral edge of an upward opening of the fluid inlet channel (2a), a diaphragm (valve element) (4) which is pressed (moves in the closing direction) or drawn (moves in the opening direction) through the annular valve seat (3) to close or open the fluid inlet channel (2a), a vertically movable valve element holder (5) for holding the diaphragm (4), a cylindrical bonnet (6) having a lower end inserted into a recessed portion formed in the valve case (2) and extending upward, a hexagon cap nut (7) fixing the bonnet (6) to the valve case (2), a casing (8) having a lower end fixed to an upper end of the bonnet (6), a stem-shaped body (9) serving as the working member in automatic opening and closing which is inserted into the bonnet (6) so as to be vertically movable and has an upper part provided in the casing (8), a lower piston (10) integrated with the stem-shaped body (9) in the vicinity of the lower end of the casing (8), a compression coil spring (an elastic member for biasing the stem-shaped body) (11) provided between a lower end of the stem-shaped body (9) and the upper end of the bonnet (6) to bias the stem-shaped body (9) downward, a counter plate (12) fitted in the stem-shaped body (9) at an upper part of the lower piston (10) and fixed to the casing (8), an upper piston (13) integrated with the stem-shaped body (9) above the counter plate (12) in the casing (8), a lower bearing (14) mounted on the stem-shaped body (9) so as to be in contact with an upper surface of the upper piston (13), a tube-shaped body (15) serving as the working member in manual opening and closing, having a lower part fitted in an upper end of the stem-shaped body (9) above the lower bearing (14), a movable channel member (16) fitted in an upper part of the tube-shaped body (15) so as to be movable vertically, an operation axis (17) with an operation handle (18) connected to the tube-shaped body (15), a compression coil spring (elastic member for biasing the movable channel member) (19) disposed between the operation axis (17) and the movable channel member (16) and serving as an elastic member which biases the movable channel member (16) downward, and an upper bearing (20) disposed between an upper surface of a large-diameter axis portion (61) of the operation axis (17) and a lower surface of a top wall of the casing (8).

Since a constitution below the upper piston (13) is the same as that of the well-known automatic valve, its detailed description will be omitted. In addition, the constitution below the upper piston (13) is not limited to the illustrated one so that it can be replaced with constitutions of well-known various automatic valves.

The casing (8) includes a tube-shaped casing body (21), a bottom wall (22) screwed into a lower end of the casing body (21) and fixed to the bonnet (6), and a top wall (23) fitted in an upper end of the casing body (21). A hole for inserting the stem-shaped body (9) is formed in the bottom wall (22), and a hole for inserting the operation axis (17) is formed in the top wall (23).

Formed in the casing body (21) are a cylinder chamber (24) formed at the lower part of the body and slidably guiding the lower and upper pistons (10) and (13), a female thread continued to an upper end of the cylinder chamber (24) and having a diameter smaller than it, a small-diameter inner periphery surface (26) provided at an upper end of the female thread (25), a large-diameter circumference surface (27) continued to an upper end of the small-diameter inner periphery surface (26), and a recessed portion (28) extending in a peripheral direction over almost ¼ of a circumference at an upper part of the large-diameter circumference surface (27).

A lower compressed fluid inlet chamber (29) is formed between the lower piston (10) and the casing bottom wall (22), and an upper compressed fluid inlet chamber (30) is formed between the upper piston (13) and the counter plate (12). Provided in the casing body (21) are a diameter-direction through thread (compressed fluid channel in the casing wall) (31) opening into a lower part inner periphery of the small-diameter circumference surface (26) and connected to a compressed fluid inlet pipe, and a diameter-direction through hole (fluid outlet channel in the casing wall) (32) opening into an upper part inner periphery of the small-diameter circumference surface (26).

Formed in the stem-shaped body (9) are an axis-direction channel (37) extending from a position slightly lower than a lower surface of the lower piston (10) to a part near the upper end of the stem-shaped body (9), a diameter-direction channel (38) extending from a lower end of the axis-direction channel (37) to the lower compressed fluid inlet chamber (29) in the diameter direction, a diameter-direction channel (39) extending from a middle part of the axis-direction channel (37) to the upper compressed fluid inlet chamber (30) in the diameter direction, and a diameter-direction channel (40) extending from an upper end of the axis-direction channel (37) in the diameter direction and opening into an upper end outer periphery of the stem-shaped body (9). These channels (37), (38), (39), and (40) form compressed fluid channels in the stem-shaped body (9).

The lower bearing (14) is a thrust bearing whose lower bearing ring is integrated with the upper surface of the upper piston (13) and whose upper bearing ring is positioned slightly apart from a lower surface of the tube-shaped body (15) in a normal state where the tube-shaped body (15) is in the automatic opening and closing enabled position as shown in FIG. 1.

The tube-shaped body (15) has a male thread (41) screwed in the female thread (25) formed in the casing body (21), a sliding portion (42) provided so as to be continued to an upper end of the male thread (41) and slidably fitted in the small-diameter inner periphery surface (26) of the casing body (21), and a projected portion (43) provided at an upper end of the sliding part (42) and fitted in a recessed portion (62) formed in the lower end surface of the operation axis (17). When the tube-shaped body (15) is rotated, the male thread (41) is rotated with respect to the female thread (25) of the casing body (21) and the tube-shaped body (15) is moved downward while being rotated.

As shown in FIG. 2, the movable channel member (16) has a large-diameter axis (51) slidably fitted in the tube-shaped body (15), a small-diameter axis (52) continued to an upper end of the large-diameter axis (51), a circular recessed portion (53) provided on a lower end surface of the large-diameter axis (51), and a flange (54) provided near an upper end of the small-diameter axis (52).

The operation axis (17) has a large-diameter portion (61) having, at its lower end surface, the circular recessed portion (62) fitted in the projected portion (43) of the tube-shaped body (15), a small-diameter portion (63) continued to an upper end of the large-diameter portion (61), and a diameter-direction protrusion (64) provided at an outer periphery of the large-diameter portion (61) and fitted in the recessed portion (28) of the casing body (21). The small-diameter portion (63) penetrates the casing top wall (23) and protrudes upward. Since the recessed portion (28) of the casing body (21) is formed so as to extend over almost ¼ (more than ¼ in practice in view of variation) of its circumference in the peripheral direction, the rotatable angle of the operation axis (17) is set at almost 90° (90° or more)

The operation handle (18) is fixed to an upper projection of the small-diameter portion (63) of the operation axis (17) and a contour shape of a part fitted in the small-diameter portion (63) is almost oval, and a circular flange (18a) is formed at its lower end.

The compression coil spring (19) is fitted in an upper end of the tube-shaped body (15), its upper end is received by a bottom surface of the recessed portion (62) of the operation axis (17) and its lower end is received by an upper surface of the flange (54) of the movable channel member (16).

The upper bearing (20) is a thrust bearing, and it is disposed between the lower surface of the casing top wall (23) and an upper surface of the large-diameter portion (61) of the operation axis (17), and its lower bearing ring is fixed to the large-diameter portion (61) of the operation axis (17).

Display characters "Enabled (automatic opening and closing enabled state)" or "Disabled (automatic opening and closing disabled state)" (not shown) are provided on an upper surface of the casing top wall (23) and these can be observed from a window formed in the flange (18a) of the operation handle (18).

Then, referring to FIG. 2, constitutions of the upper end of the stem-shaped body (9), the tube-shaped body (15) and the movable channel member (16) will be described.

The upper end of the stem-shaped body (9) is formed smaller in diameter than its lower part and an annual groove (35) whose bottom surface diameter is smaller than an inner diameter of a small-diameter portion (33) is formed at a boundary between a large-diameter portion (34) and the small-diameter portion (33). An O-ring (36) is fitted in the annular groove (35). A lower surface of the annular groove (35) protrudes outward more than an upper surface thereof in the diameter direction and an outer diameter of the O-ring (36) mounted on the lower surface is larger than the outer diameter of the upper surface of the annular groove (35). Thus, in the normal state where the tube-shaped body (15) is at the automatic opening and closing enabled position, a gap (G1) serving as the compressed fluid channel is provided between a lower end surface of the-movable channel member (16) and the O-ring (36). The O-ring (36) fitted in the annular groove (35) has both functions of a sealing function which shuts off the gap (G1) when the movable channel member (16) is further moved downward from the position shown in FIG. 2, and a stopper function which determines a lower limit position of the movable channel member (16).

An inner diameter of the upper end of the sliding portion (42) of the tube-shaped body (15) is larger than that of a lower part thereof and an annular groove (46) whose bottom surface diameter is larger than the inner diameter of the large-diameter portion is formed at a boundary between a large-diameter portion (44) and a small-diameter portion (45). An O-ring (47) is fitted in the annular groove (46). A lower surface of the annular groove (46) protrudes inward more than an upper surface thereof in the diameter direction and an inner diameter of the O-ring (47) mounted on the lower surface is smaller than the inner diameter of the upper surface of the annular groove (46). Thus, in the automatic opening and closing enabled state shown in FIG. 2, the O-ring (47) fitted in the annular groove (46) has both functions of a sealing function which shuts off a gap (G2) formed between the flange (54) of the movable channel member (16) and the tube-shaped body (15) (refer to FIG. 6), and a stopper function which determines a stop position of the movable channel member (16).

In the normal state where the tube-shaped body (15) is in the automatic opening and closing enabled position, the tube-shaped body (15) is provided with a diameter-direction through hole (compressed fluid channel in the tube-shaped body) (48) having one end connected to the compressed fluid channel (31) in the casing wall, and the other end opening to the inner periphery, and a diameter-direction through hole (fluid outlet channel in the tube-shaped body) (49) provided above the fluid outlet channel (32) in the casing wall and shut off by that channel (32) and an O-ring (50).

Formed in the movable channel member (16) are an axis-direction channel (55) extending from a bottom surface of the recessed portion (53) to a middle of the small-diameter axis (52) and a diameter-direction channel (56) extending from an upper end of the axis-direction channel (55) in the diameter direction and opening to an outer periphery of the small-diameter axis (52). When the tube-shaped body (15) is in the automatic opening and closing enabled position, there is a gap between the bottom surface of the recessed portion (53) of the movable channel member (16) and an upper end surface of the stem-shaped body (9), and a lower end of the axis-direction channel (55) in the movable channel member (16) opens into this gap.

The large-diameter axis (51) of the movable channel member (16) is loosely fitted in the tube-shaped body (15), and an annular gap (57) is formed between an inner periphery of the tube-shaped body (15) and an outer periphery of a lower part of the movable channel member (16). The small-diameter axis (52) of the movable channel member (16) is further loosely fitted in the tube-shaped body (15), and an annular gap (58) is formed between an inner periphery of the tube-shaped body (15) and an upper outer periphery of the movable channel member (16). An annular groove is formed around an outer periphery near the upper end of the large-diameter axis (51) of the movable channel member (16), and an O-ring (60) is fitted in the groove. Thus, the connection between the lower annular gap (57) and the upper annular gap (58) are shut off. In addition, since the upper end of the stem-shaped body (9) is loosely fitted in the recessed portion (53) of the movable channel member (15), an annular gap (59) is also formed between an inner surface of the recessed portion (53) of the movable channel member (15) and an upper end outer periphery of the stem-shaped body (9). In addition, since the flange (54) of the movable channel member (16) is also loosely fitted in the large-diameter portion (44) of the tube-shaped body (15), an annular gap (67) is formed between an outer periphery of the flange (54) of the movable channel member (16) and an inner periphery of the large-diameter portion (44) of the tube-shaped body (15).

The compressed fluid channels of the movable channel member (16) is formed from the lower annular gap (57) of the movable channel member (16), the annular gap (59) of the recessed portion (53) of the movable channel member (15), and the gap (G1) between the lower end surface of the movable channel member (16) and the O-ring (36). Furthermore, the fluid outlet channels of the movable channel member (16) is formed from the axis-direction channel (55) and the diameter-direction channel (56) in the movable channel member (15), the upper annular gap (58) of the movable channel member (15), the annular gap (67) of the flange (54) of the movable channel member (16), and the gap (G2) between the flange (54) of the movable channel member (16) and the O-ring (47).

When the tube-shaped body (15) is in the automatic opening and closing enabled position, since the slight gap (G1) is provided between the lower end surface of the movable channel member (16) and the O-ring (36) fitted in the annular groove (35) of the stem-shaped body (9), the diameter-direction channel (40) of the compressed fluid channel in the stem-shaped body and the compressed fluid channel (31) in the casing wall are connected through the annular gap (59) on the inner surface of the recessed portion (53) of the movable channel member (16), the gap (G1) between the lower end surface of the movable channel member (16) and the O-ring (36), the lower annular gap (57) of the outer periphery of the movable channel member (16), and the compressed fluid channel (48) in the tube-shaped body. Thus, the compressed fluid channels from the compressed fluid channel (31) in the casing wall to the compressed fluid inlet chambers (29) and (30) are opened. Thus, when a lower surface of the flange (54) of the movable channel member (16) presses the O-ring (47), the connection between the upper annular gap (58) of the outer periphery of the movable channel member (16) and the fluid outlet channel (49) in the tube-shaped body is shut off and the fluid outlet channel is closed.

Therefore, in the state shown in FIGS. 1 and 2, the normal channel automatic opening and closing can be implemented by introducing the compressed fluid from the outside or discharging it to the outside through the compressed fluid channel (31) in the casing wall.

As shown in FIG. 4, three protrusions (65) are formed at predetermined intervals around the outer periphery of the projected portion (43) provided at the upper end of the tube-shaped body (15). As shown in FIG. 3, a large number of bumps (serration) (66) serving as grooves corresponding to the protrusions (65) are formed around an inner periphery of the recessed portion (62) provided at a lower end surface of the large-diameter axis (61) of the operation axis (17). Therefore, when the operation axis (17) is fitted in the tube-shaped body (15), the operation axis (17) can be rotated with respect to the tube-shaped body (15) within a range of the multiple of a pitch of the serration (66).

According to this embodiment, when the operation handle (18) is rotated by 90°, the automatic opening and closing enabled state and the automatic opening and closing disabled state are changed over. There are various kinds of positions in the closing position and the opening position of the stem-shaped body (9) depending on the individual fluid control device, and there are also various kinds of the positions (positions in the rotational direction) of the tube-shaped body (15) integrated with the stem-shaped body (9). In this case, variation in position can be absorbed by fitting the operation axis (17) in the tube-shaped body (15) so that the operation handle (18) may be turned in a predetermined direction. Thus, in the automatic opening and closing enabled state shown in FIG. 1, the longitudinal direction of the operation handle (18) is in backward and forward direction in the paper and in the automatic opening and closing disabled state shown in FIG. 5, the longitudinal direction of the operation handle (18) is in right and left direction in the paper.

When the operation handle (18) is turned from the state shown in FIGS. 1 and 2, the male thread (41) of the tube-shaped body (15) is rotated with respect to the female thread (25) of the casing body (21). Although the operation axis (17) is biased upward by the compression coil spring (19), since it is pressed toward the lower surface of the casing top wall (23) through the upper bearing (20), the operation handle (18) can be easily turned to the casing (8). Thus, as the tube-shaped body (15) is moved downward while being rotated, the lower surface of the tube-shaped body (15) abuts on the lower bearing (14) (refer to FIG. 5). At this time, the fluid outlet channel (49) in the tube-shaped body is lowered to the same position in level as that of the outlet channel (32) in the casing wall. This position is the automatic opening and closing disabled position and as shown in FIG. 6 in an enlarged manner, the lower end surface of the movable channel member (16) presses the O-ring (36) fitted in the annular groove (35) of the stem-shaped body (9), so that the connection between the annular gap (59) on the inner periphery of the recessed portion of the movable channel member (16) and the lower annular gap (57) on the outer periphery of the movable channel member (16) is shut off, and the compressed fluid channels from the compressed fluid channel (31) in the casing wall to the compressed fluid inlet chambers (29) and (30) are closed. Meanwhile, since the downward bias force from the compression coil spring (19) is decreased and upward bias force generated by the compression of the O-ring (36) is increased, the movable channel member (16) is stopped when the above downward bias force is balanced with the upward bias force. When the tube-shaped body (15) is further lowered from this balanced state, the movable channel member (16) which cannot follow this movement is moved upward with respect to the tube-shaped body (15). Thus, the gap (G2) is generated between the lower surface of the flange (54) of the movable channel member (16) and the O-ring (47). Thus, the fluid outlet channels (55) and (56) in the movable channel member continued to the diameter-direction channel (40) of the compressed fluid channel in the stem-shaped body are connected to the fluid outlet channel (32) in the casing wall through the upper annular gap (58) on the outer periphery of the movable channel member (16), the gap (G2) between the flange (54) of the movable channel member (16) and the O-ring (47), the annular gap (67) between the outer periphery of the flange (54) of the movable channel member (16) and the inner periphery of the large-diameter portion (44) of the tube-shaped body (15), and the fluid outlet channel (49) in the tube-shaped body, so that the compressed fluid in the compressed fluid inlet chambers (29) and (30) is discharged. Thus, pressure in the compressed fluid inlet chambers (29) and (30) to the manual operation is vanished, so that the operation handle (18) can be turned with small force. After the tube-shaped body (15) abuts on the lower bearing (14), the stem-shaped body (9) receives force from the tube-shaped body (15) through the lower bearing (14) and the upper piston (13), and it is moved downward together with the tube-shaped body (15) as the operation handle (18) is turned while the rotation force is absorbed. As a result, the fluid channel (2a) in the valve case (2) is shut off. Since this shutoff is performed not by the spring but by the screwing of the threads (25) and (41), even when the pressure of the fluid channel (2a) is as high as, for example, 3500 psi, it can be surely shut off.

Figure 7:
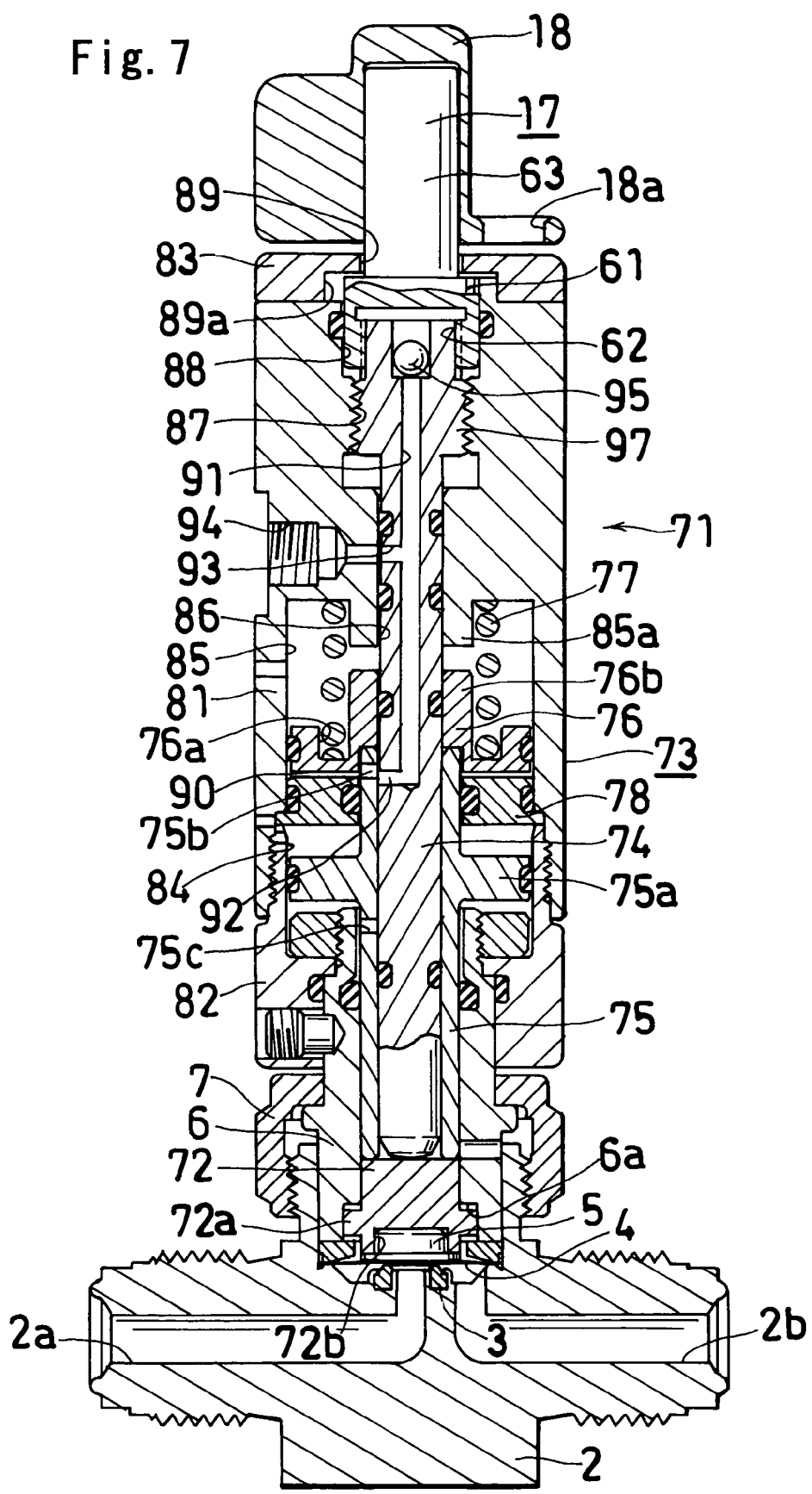
FIG. 7 is a vertical sectional view showing a second embodiment of the fluid control device according to the present invention in an automatic opening and closing disabled state.
Figure 8:
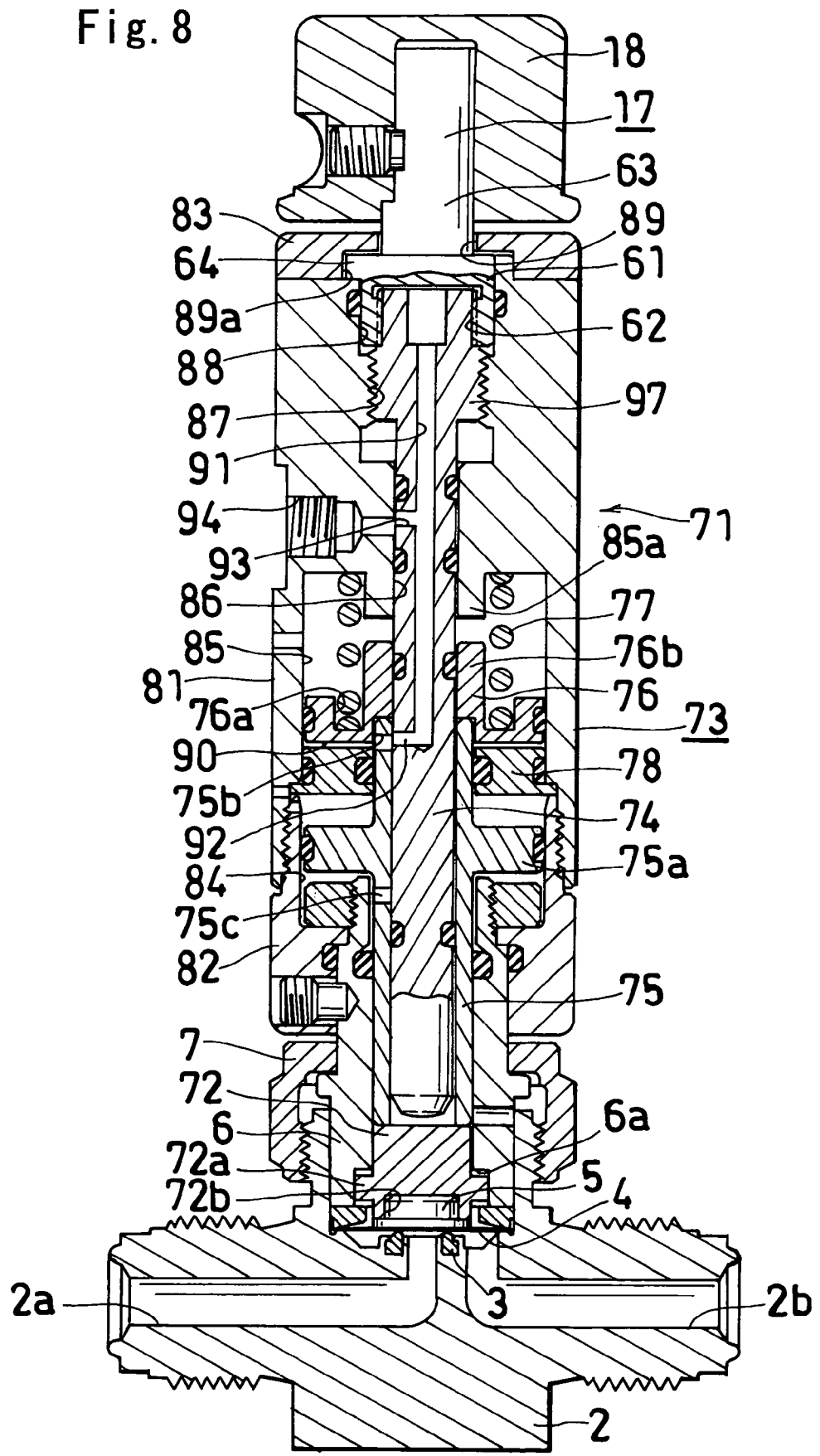
FIG. 8 shows a closed state of the automatic opening and closing enabled state of the same.
Figure 9:
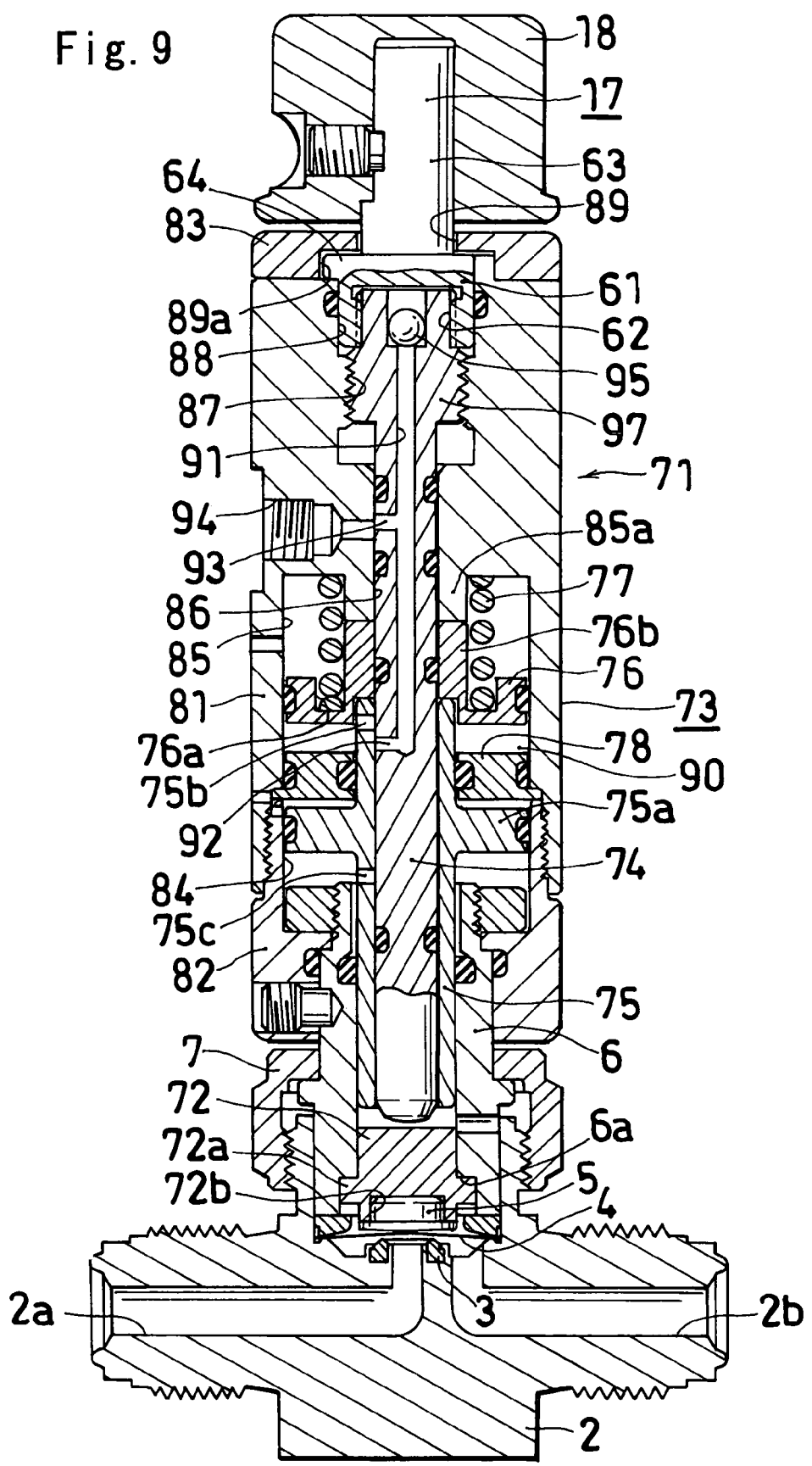
FIG. 9 shows an open state of the automatic opening and closing enabled state of the same.
Figure 10:
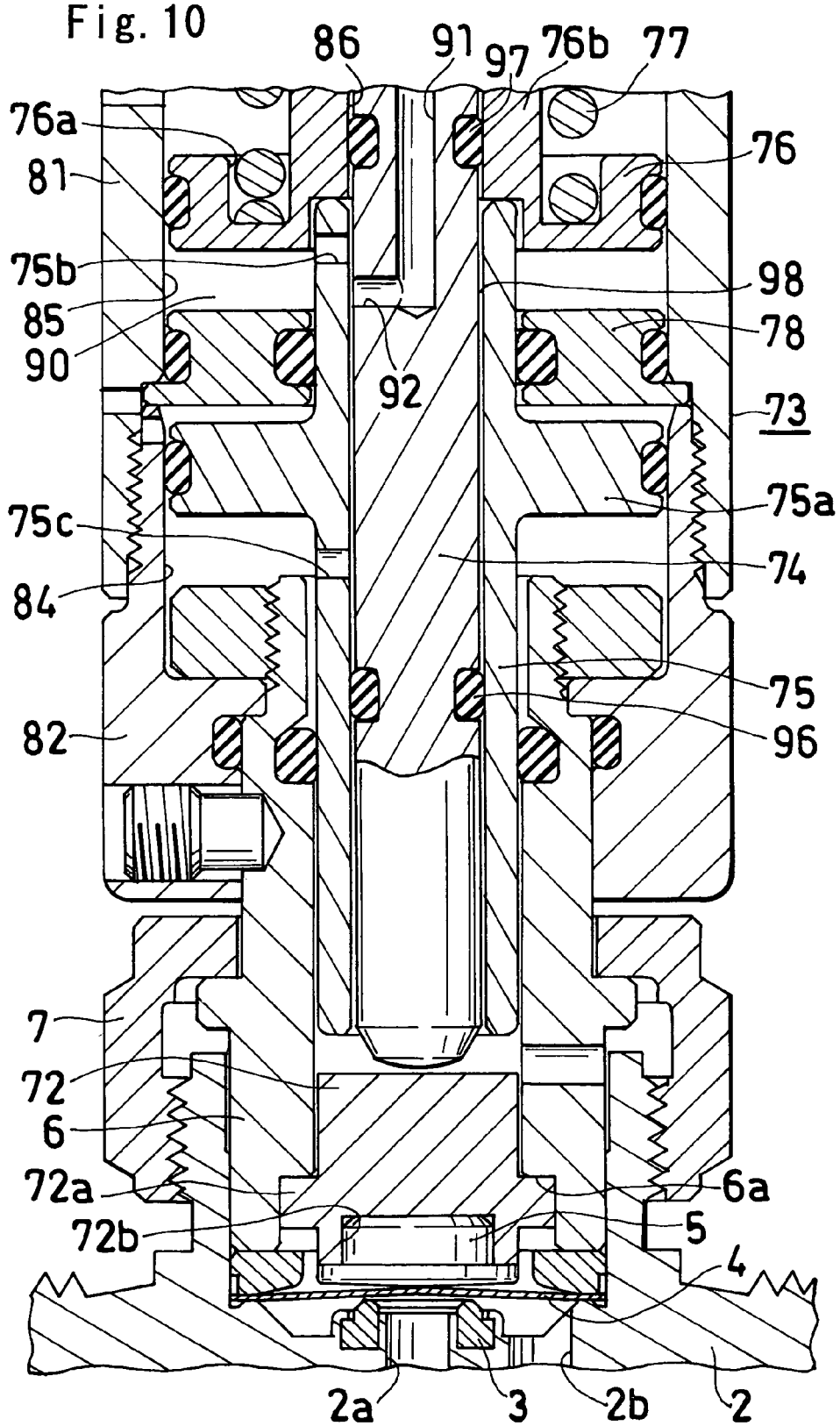
FIG. 10 is an enlarged view showing a main part of FIG. 9.
Figure 11:
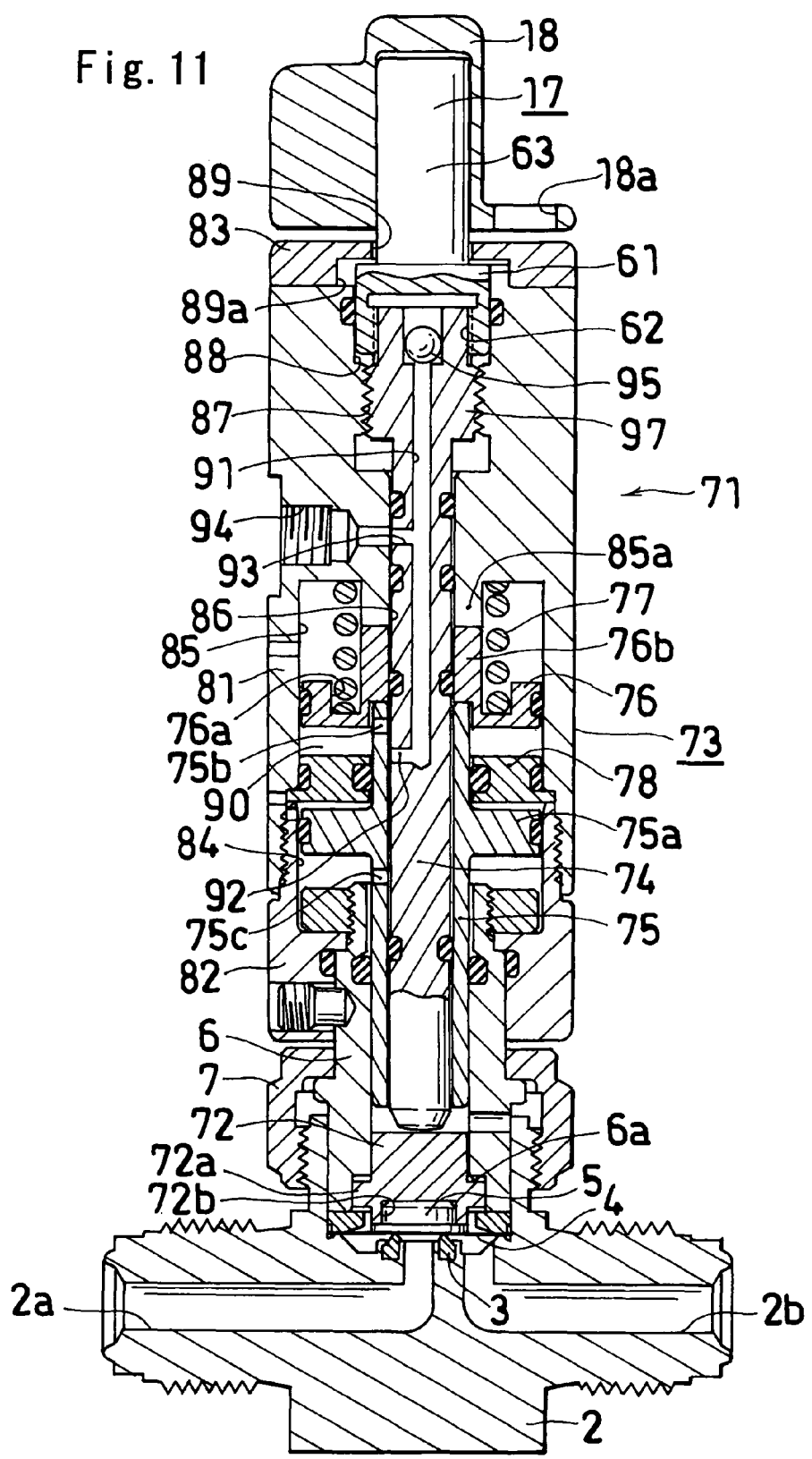
FIG. 11 shows a closed state of the same in the event of an emergency.

FIGS. 7 to 11 show a second embodiment of the fluid control device according to the present invention. FIG. 7 shows an automatic opening and closing disabled state where a stem-shaped body (74) serving as a working member in manual opening and closing and a tube-shaped body (75) serving as a working member in automatic opening and closing are in closing positions, respectively. FIG. 8 shows a closed state of an automatic opening and closing enabled state where the stem-shaped body (74) serving as the working member in manual opening and closing is in an opening position and the tube-shaped body (75) serving as the working member in automatic opening and closing is in a closing position. FIGS. 9 and 10 show an open state of the automatic opening and closing enabled state where the stem-shaped body (74) serving as the working member in manual opening and closing is in the opening position and the tube-shaped body (75) serving as the working member in automatic opening and closing is also in the opening position. FIG. 11 shows a closed state in the event of an emergency in which the stem-shaped body (74) serving as the working member in manual opening and closing is moved to the closing position when the tube-shaped body (75) serving as the working member in automatic opening and closing is in the opening position.

A fluid control device (71) according to the second embodiment comprises a valve case (2) having a fluid inlet channel (2a) and a fluid outlet channel (2b), an annular valve seat (3) provided at a peripheral edge of an upward opening of the fluid inlet channel (2a), a diaphragm (valve element) (4) which is pressed (moves in the closing direction) or drawn (moves in the opening direction) through the annular valve seat (3) to close or open the fluid inlet channel (2a), a vertically movable valve element holder (5) for holding the diaphragm (4), a disc (72) having a lower end to which the valve element holder (5) is attached, a cylindrical bonnet (6) having a lower end inserted into a recessed portion formed in the valve case (2) and extending upward, a hexagon cap nut (7) fixing the bonnet (6) to the valve case (2), a casing (73) having a lower end fixed to an upper end of the bonnet (6), the stem-shaped body (74) serving as the working member in manual opening and closing, which is provided in the casing (73) and has a lower end inserted into the bonnet (6) so as to be vertically movable, the tube-shaped body (75) serving as the working member in automatic opening and closing, which is fitted in a lower end of the stem-shaped body (74) so as to be movable vertically, an upper piston (76) formed when an annular pressure receiving member fixed to an upper end of the tube-shaped body (75) is fixed, a compression coil spring (an elastic member for biasing the tube-shaped body) (77) to bias the tube-shaped body (75) downward through the upper piston (76), a counter plate (78) fitted in the vicinity of an upper end of the tube-shaped body (75) below the upper piston (76) so as to be relatively movable and fixed to the casing (73), and an operation axis (17) with an operation handle (18) provided at an upper end of the stem-shaped body (74).

The disc (72) is in the shape of a short cylindrical column which has a flange (72a), and a recessed portion (72b) in which the valve element holder (5) is fitted and fixed is formed at its lower end. An annular guide (6a) which guides the flange (72a) of the disc (72) so as to be movable is formed on an inner periphery of the bonnet (6). The disc (72) and the valve element holder (5) are vertically movable within a range controlled by the guide (6a).

The casing (73) includes a tube-shaped casing body (81), a bottom wall (82) screwed into a lower end of the casing body (81) and fixed to the bonnet (6), and a top wall (83) fitted in an upper end of the casing body (81). A piston insertion hole to which the tube-shaped body (75) is inserted so as to be vertically movable is formed in the bottom wall (82) and a stepped hole (89) to which the operation axis (17) is inserted so as to be vertically movable is formed in the top wall (83). A recessed portion (89a) extending in the peripheral direction is formed at a large-diameter portion of the stepped hole (89) over almost ¼ of the circumference.

Formed on an inner periphery of the casing body (81) are lower and upper large-diameter guides (upper guides) (84) and (85) vertically separated by the counter plate (78), a small-diameter guide (lower guide) (86) continued to an upper end of the upper large-diameter guide (85) and having a diameter smaller than that, a female thread (87) continued to an upper end of the small-diameter guide (86), and an opening (88) provided at an upper end of the female thread (87). Thus, the lower large-diameter guide (84) guides a lower piston (75a) provided integrally with a middle part of the tube-shaped body (75) so as to be vertically movable, the upper large-diameter guide (85) guides the upper piston (76) fixed to the tube-shaped body (75) so as to be vertically movable. A compressed fluid inlet chamber (90) is formed between the counter plate (78) and the upper piston (76) of the tube-shaped body (75).

Formed in the stem-shaped body (74) are an axis-direction channel (91) extending from a position which is the almost the same as an upper surface of the counter plate (78) to the upper end of the stem-shaped body (74), a lower end diameter-direction channel (92) extending from a lower end of the axis-direction channel (91) in the diameter direction and continued to the compressed fluid inlet chamber (90) through a diameter-direction through hole (75b) provided at the upper end of the tube-shaped body (75), and a middle diameter-direction channel (93) extending from a middle part of the axis-direction channel (91) in the diameter direction and continued to a compressed fluid inlet portion (94) provided on a peripheral wall of the casing body (81). An upper end of the axis-direction channel (91) has a diameter larger than that of its lower part and a shutoff sphere (95) which closes an upper end opening of the axis-direction channel (91) is provided at this large-diameter portion.

Compressed air introduced from the compressed fluid inlet portion (94) reaches the axis-direction channel (91) through the middle diameter-direction channel (93) of the stem-shaped body (74) and flows upward and downward in the channel (91). The compressed air flown through the axis-direction channel (91) in a downward direction is introduced from the lower end diameter-direction channel (92) to the compressed fluid inlet chamber (90) through the diameter-direction through hole (75b) of the tube-shaped body (75). The compressed air flown through the axis-direction channel (91) in an upward direction is prevented from being discharged to the outside by the shutoff sphere (95) which closes the upper end opening, whereby pressure in the compressed fluid inlet chamber (90) is increased to a set pressure of the compressed air.

A male thread (97) screwed into the female thread (87) formed in the casing body (81) is formed in the vicinity of the upper end of the stem-shaped body (74), and a portion continued to an upper end of the male thread (97) is connected to a lower end of the operation axis (17). When the handle (18) and the operation axis (17) are turned, the stem-shaped body (74) is rotated and the male thread (97) is rotated with respect to the female thread (87) of the casing body (81). As a result, the stem-shaped body (74) is vertically moved while being rotated. FIG. 7 shows a state where the stem-shaped body (74) is moved downward and its lower end abuts on an upper surface of the disc (72), that is, a closed state by a manual operation.

Since the upper piston (76) is fixed to the upper end of the tube-shaped body (75) and the upper piston (76) is biased downward by the compression coil spring (77), the tube-shaped body (75) is biased downward by the compression coil spring (77). In the state where the compressed air has not been introduced into the compressed fluid inlet chamber (90) shown in FIG. 7, its lower end abuts on the upper surface of the disc (72). Then, as will be described later, when the compressed air is introduced into the compressed fluid inlet chamber (90), the upper piston (76) is moved upward by the compressed air and the lower end of the tube-shaped body (75) is separated from the upper surface of the disc (72).

The operation axis (17) has a large-diameter portion (61) having a circular recessed portion (62) fitted in a connection portion (95) of the upper end of the stem-shaped body (74) on a lower end surface, a small-diameter portion (63) continued to an upper end of the large-diameter portion (61) and penetrating the casing top wall (83) to be protruded upward, and a diameter-direction protrusion (64) (refer to FIG. 8) provided at an outer periphery of the large-diameter portion (61) and fitted in the recessed portion (89a) provided at the large-diameter portion of the stepped hole (89) to which the operation axis is inserted in the top wall (83). Since the recessed portion (89a) of the stepped hole (89) to which the operation axis is inserted in the top wall (83) is formed so as to extend over almost ¼ (more than ¼ in practice in view of variation) of its circumference in the peripheral direction, the rotatable angle of the operation axis (17) is set at almost 90° (90° or more)

The operation handle (18) is fixed to an upper protrusion of the small-diameter portion (63) of the operation axis (17) and a contour shape of a part fitted in the small-diameter portion (63) is almost oval. A shape of the operation handle (18) is slightly different from that in the first embodiment. That is, a left part is in the shape of a half-column and a right part is in the shape of a semicircular plate in FIG. 7. The semicircular plate is provided at a display of the top wall (83) and display characters "Enabled (automatic opening and closing enabled state)" or "Disabled (automatic opening and closing disabled state)" can be observed from its window (18a).

According to the compression coil spring (77), its upper end is received by an upper surface of the upper large-diameter guide (85), and its lower end is received by an annular spring-retainer recessed portion (76a) provided in the upper piston (76). In addition, a lower protrusion edge (85a) to position the compression coil spring (77) is formed on the inner periphery on the upper surface of the large-diameter guide (85). In addition, an upper protrusion edge (76b) to improve a concentric property when the upper piston (76) is moved with respect to the stem-shaped body (74) is formed on the inner periphery of the annular spring-retainer recessed portion (76a) of the upper piston (76).

A state shown in FIG. 7 is the automatic opening and closing disabled state where the stem-shaped body (74) serving as the working member in manual opening and closing and the tube-shaped body (75) serving as a working member in automatic opening and closing are in closing positions, respectively. In this state, when the compressed air is introduced into the compressed air inlet chamber (90), although the tube-shaped body (75) is moved upward, the stem-shaped body (74) keeps the state where the disc (72) is pressed downward. As a result, the opening and closing operation by automatic opening and closing means is canceled and even when the opening operation to introduce the compressed air into the compressed air inlet chamber (90) is performed, the channels from the fluid inlet channel (2a) to the fluid outlet channel (2b) are not opened.

When the operation handle (18) is moved to the automatic opening and closing enabled state from the state shown in FIG. 7, the stem-shaped body (74) serving as the working member in manual opening and closing is moved upward as shown in FIG. 8. FIG. 8 is different from FIG. 7 in positions (states) of the operation handle (18), the operation axis (17) and the stem-shaped body (74). Thus, the tube-shaped body (75), the upper piston (76), the compression coil spring (77), the disc (72), the valve element holder (5), the diaphragm (4) and the like in FIG. 8 are the same as those in FIG. 7.

In the state shown in FIG. 8, when a pipe is connected to the compressed fluid inlet portion (94) and the compressed air is introduced from here to the compressed air inlet chamber (90), a state shown in FIG. 9 is implemented so that the stem-shaped body (74) serving as the working member in manual opening and closing is moved upward. FIG. 9 is different from FIG. 8 in positions (states) of the tube-shaped body (75), the upper piston (76), the compression coil spring (77), the disc (72), the valve element holder (5) and the diaphragm (4). The upper piston (76) and the tube-shaped body (75) integrally provided therewith are moved upward against elastic force of the compression coil spring (77) by the compressed air introduced into the compressed air inlet chamber (90).

Accordingly, the compression coil spring (77) is compressed so that force pressing the disc (72), the valve element holder (5) and the diaphragm (4) downward is removed. As a result, the diaphragm (4) is moved in the opening direction by pressure of the fluid in the fluid inlet channel (2a) and the channels from the fluid inlet channel (2a) to the fluid outlet channel (2b) are opened.

As shown in FIG. 10 in which a main part in FIG. 9 is shown in an enlarged manner, the O-ring (96) is fitted in near the lower end of the outer periphery of the stem-shaped body (74), and the O-ring (97) is also fitted in at the upper part of the lower end diameter-direction channel (92) of the outer periphery of the stem-shaped body (74). Thus, an annular channel (98) is formed as a gap between the outer periphery of the stem-shaped body (74) and the inner periphery of the tube-shaped body (75), between the two O-rings (96) and (97), so that the compressed air in the axis-direction channel (91) of the stem-shaped body (74) can be moved from the lower end diameter-direction channel (92) to the annular channel (98). In addition, a middle diameter-direction channel (75c) which is continued to a lower space of the lower piston (75b) of the tube-shaped body (75) through an annular gap between the outer periphery of the tube-shaped body (75) and the inner periphery of the bonnet is formed in the tube-shaped body (75). Therefore, the compressed air introduced from the compressed fluid inlet portion (94) is introduced to the compressed air inlet chamber (90) and also introduced to the lower space of the lower piston (75a) of the tube-shaped body (75) through the annular channel (98) and the middle diameter-direction channel (75c) of the tube-shaped body (75), and the tube-shaped body (75) is stopped when the elastic force of the compression coil spring (77) is balanced with a sum of a compressed air pressure pressing the lower piston (75a) upward and a compressed air pressure pressing the upper piston (76) upward. The compressed air pressure pressing the lower piton (75a) upward is equal to the compressed air pressure pressing the upper piston (76) upward, and this pressure is kept in each of the channels (91), (92), and (93) in the stem-shaped body (74).

When the operation handle (18) is moved to the automatic opening and closing disabled position in the state where the fluid channel is in the open state shown in FIG. 9, a state where the stem-shaped body (74) serving as the working member in manual opening and closing is moved downward is implemented as shown in FIG. 11. FIG. 11 is different from FIG. 9 in positions (states) of the operation handle (18), the operation axis (17) and stem-shaped body (74). Thus, the tube-shaped body (75), the upper piston (76), the compression coil spring (77), the disc (72), the valve element holder (5), the diaphragm (4) and the like in FIG. 11 are the same as those in FIG. 9. In this state, although the tube-shaped body (75) is in a state where the channel is opened, when the stem-shaped body (74) is moved downward manually, the channel can be closed. That is, in the event of an emergency, the fluid channel (2a) in the valve case (2) can be shut off manually. Since this shutoff is performed not by the spring but by the screwing of the threads (87) and (97), even when the pressure of the fluid channel (2a) is as high as 3500 psi for example, it can be surely shut off. In addition, the state shown in FIG. 11 is the same as the state where the compressed air is introduced in the state in FIG. 7. FIG. 11 is different from FIG. 7 in positions (states) of the tube-shaped body (75), the upper piston (76), the compression coil spring (77), the disc (72), the valve element holder (5) and the diaphragm (4).

INDUSTRIAL APPLICABILITY

Since the fluid control device according to the present invention has both functions as a manual valve and an automatic valve, the conventional opening and closing mechanism including the automatic valve and the manual valve can be replaced with one control device, and it can be appropriately used in various kinds of fluid control devices.

The invention claimed is:

1. A fluid control device comprising:
   a valve case having a fluid channel;
   a casing provided above the valve case;
   a valve element opening and closing the fluid channel;
   a valve element holder moved between a closing position at which it is moved downward to set the valve element in a closed state and an opening position at which it is moved upward to set the valve element in an open state;
   an elastic member biasing the valve element to the closing position or the opening position; and
   a working member in automatic opening and closing, which is vertically moved by automatically opening and closing means to move the valve element holder to the opening position or the closing position against bias force of the elastic member,
   the fluid control device further comprising a working member in manual opening and closing, which is vertically moved by a manual operation to press the valve element holder downward when it is moved downward,
   a movable channel member movably fitted in a tube-shaped body serving as the working member in manual opening and closing,
   wherein the working member in manual opening and closing is arranged in a fluid-tight casing and moved to an automatic opening and closing enabled position at which there is a predetermined gap between the working member in automatic opening and closing and an upper surface of a part moving integrally therewith, to an automatic opening and closing enabled position at which it abuts on the upper surface of the part moving integrally with the working member in automatic opening and closing, and to a working position at which it is further moved downward to lower the working member in automatic opening and closing by manually operating an operation handle, the movable channel member is stopped at a position where its travel distance is smaller than a travel distance when the working member in manual opening and closing is moved from the automatic opening and closing enabled position to the automatic opening and closing disabled position, a compressed fluid channel is formed in the working member in automatic opening and closing, which has an upper end provided in a lower part of the working member in manual opening and closing and extends downward from the upper end to be continued to a compressed fluid inlet chamber, a compressed fluid channel positioned near a lower end of the movable channel member and a fluid outlet channel positioned near an upper end of the movable channel member are formed in the casing, a compressed fluid channel continued to the compressed fluid channel of the casing when the working member in manual opening and closing is in the automatic opening and closing enabled position, and a fluid outlet channel continued to the fluid outlet channel of the casing when the working member in manual opening and closing is lowered to the automatic opening and closing enabled position are formed in the working member in manual opening and closing, and a compressed fluid channel which connects to the compressed fluid channel in the working member in manual opening and closing, to the compressed fluid channel in the working member in automatic opening and closing when the working member in manual opening and closing is in the automatic opening and closing enabled position; and
   a fluid outlet channel which connects the fluid outlet channel in the working member in manual opening and closing to the compressed fluid channel in the working member in automatic opening and closing when the working member in manual opening and closing is lowered to the automatic opening and closing enabled position and the movable channel member is relatively moved upward with respect to the working member in manual opening and closing, and shuts off the connection when the working member in manual opening and closing is in the automatic opening and closing enabled position are formed in the movable channel member.

2. The fluid control device of claim 1, wherein means for stopping the movable channel member at a position where a travel distance of the movable channel member is smaller than that of the working member in manual opening and closing includes an elastic member biasing the movable channel member downward, and a stopper provided in the working member in automatic opening and closing to prevent the movable channel member from being further lowered.

3. The fluid control device of claim 2, wherein the movable channel member is in the shape of almost a circular column having a flange near its upper end, an annular groove in which the flange of the movable channel member is fitted so as to be vertically movable, and a fluid outlet channel connecting the annular groove and the fluid outlet channel in the casing wall are formed in the working member in manual opening and closing, and an annular sealing member which is pressed downward by the flange of the movable channel member biased by the elastic member at the automatic opening and closing enabled position is provided in the annular groove of the working member in manual opening and closing.

4. The fluid control device of any one of claims 1 to 3, wherein a projected portion is formed at an upper end of the working member in manual opening and closing, a recessed portion is formed at a lower end of an operation axis fixed to the operation handle, a plurality of protrusions are formed at equal intervals in a peripheral direction on one of the outer periphery of the projected portion of the working member in manual opening and closing and the inner periphery of the recessed portion of the operation axis, and grooves which are integral multiple of the number of the protrusions in number are formed at equal intervals on the other.

5. A fluid control device comprising:
   a valve case having a fluid channel;
   a casing provided above the valve case;
   a valve element opening and closing the fluid channel;
   a valve element holder moved between a closing position at which it is moved downward to set the valve element in a closed state and an opening position at which it is moved upward to set the valve element in an open state;
   an elastic member biasing the valve element to the closing position or the opening position;
   a working member in automatic opening and closing, which is vertically moved by automatically opening and closing means to move the valve element holder to the opening position or the closing position against bias force of the elastic member; and a working member in manual opening and closing, which is vertically moved by a manual operation to press the valve element holder downward when it is moved downward, wherein the working member in manual opening and closing serves as a stem-shaped body which is moved by a manual operation to an automatic opening and closing disabled position at which a lower end presses a top surface center of the valve element holder downward and to an automatic opening and closing enabled position at which the lower end is separated from the top surface center of the valve element holder, and the working member in automatic opening and closing serves as a tube-shaped body which is fitted over and separate from the stem-shaped working member in manual opening and closing so that an operation of the working member in manual opening and closing can be performed regardless of a force working from an automatically opening and closing means to the working member in automatic opening and closing, and so that the working member in automatic opening and closing is relatively and vertically movable and moved to a closing position at which a lower end is biased by the elastic member to press a top surface periphery of the valve element holder downward and to an opening position at which the lower end is separated from the top surface center of the valve element holder by automatically opening and closing means.

6. A fluid control device comprising:

a valve case having a fluid channel;

a casing provided above the valve case;

a valve element opening and closing the fluid channel;

a valve element holder moved between a closing position at which it is moved downward to set the valve element in a closed state and an opening position at which it is moved upward to set the valve element in an open state;

an elastic member biasing the valve element to the closing position or the opening position; and a working member in automatic opening and closing, which is vertically moved by automatically opening and closing means to move the valve element holder to the opening position or the closing position against bias force of the elastic member, the fluid control device further comprising a working member in manual opening and closing, which is vertically moved by a manual operation to press the valve element holder downward when it is moved downward, wherein the working member in manual opening and closing serves as a stem-shaped body which is moved by a manual operation to an automatic opening and closing disabled position at which a lower end presses a top surface center of the valve element holder downward and to an automatic opening and closing enabled position at which the lower end is separated from the top surface center of the valve element holder, and the working member in automatic opening and closing serves as a tube-shaped body which is fitted over and separate from the stem-shaped working member in manual opening and closing so that an operation of the working member in manual opening and closing can be performed regardless of a force working from an automatically opening and closing means to the working member in automatic opening and closing, and so that the working member in automatic opening and closing is relatively and vertically movable and moved to a closing position at which a lower end is biased by the elastic member to press a top surface periphery of the valve element holder downward and to an opening position at which the lower end is separated from the top surface center of the valve element holder by automatically opening and closing means, wherein an upper guide and a lower guide separated by a counter plate are formed in the casing, the working member in automatic opening and closing has an upper piston guided by the upper guide and a lower piston guided by the lower guide, a space between the counter plate and the upper piston of the working member in automatic opening and closing is a compressed air inlet chamber, the working member in manual opening and closing has an axis-direction channel, a lower end diameter-direction channel extending from the axis-direction channel in a diameter direction and continued to the compressed fluid inlet chamber through a diameter-direction through hole provided in the working member in automatic opening and closing, and a middle diameter-direction channel extending from a middle part of the axis-direction channel in the diameter direction and continued to the compressed fluid inlet portion provided at a peripheral wall of the casing body.

7. The fluid control device of claim 6, wherein the lower end diameter-direction channel of the working member in manual opening and closing and a space of a lower part of the lower piston of the working member in automatic opening and closing are continued by a gap on an inner periphery of the working member in automatic opening and closing, a second diameter-direction through hole formed in the working member in automatic opening and closing, and a gap on an outer periphery of the working member in automatic opening and closing.

* * * * *